Aug. 28, 1951 W. H. MANNING 2,565,926
SPRINKLER WITH ADJUSTABLE CAM
Filed June 28, 1945 2 Sheets-Sheet 2
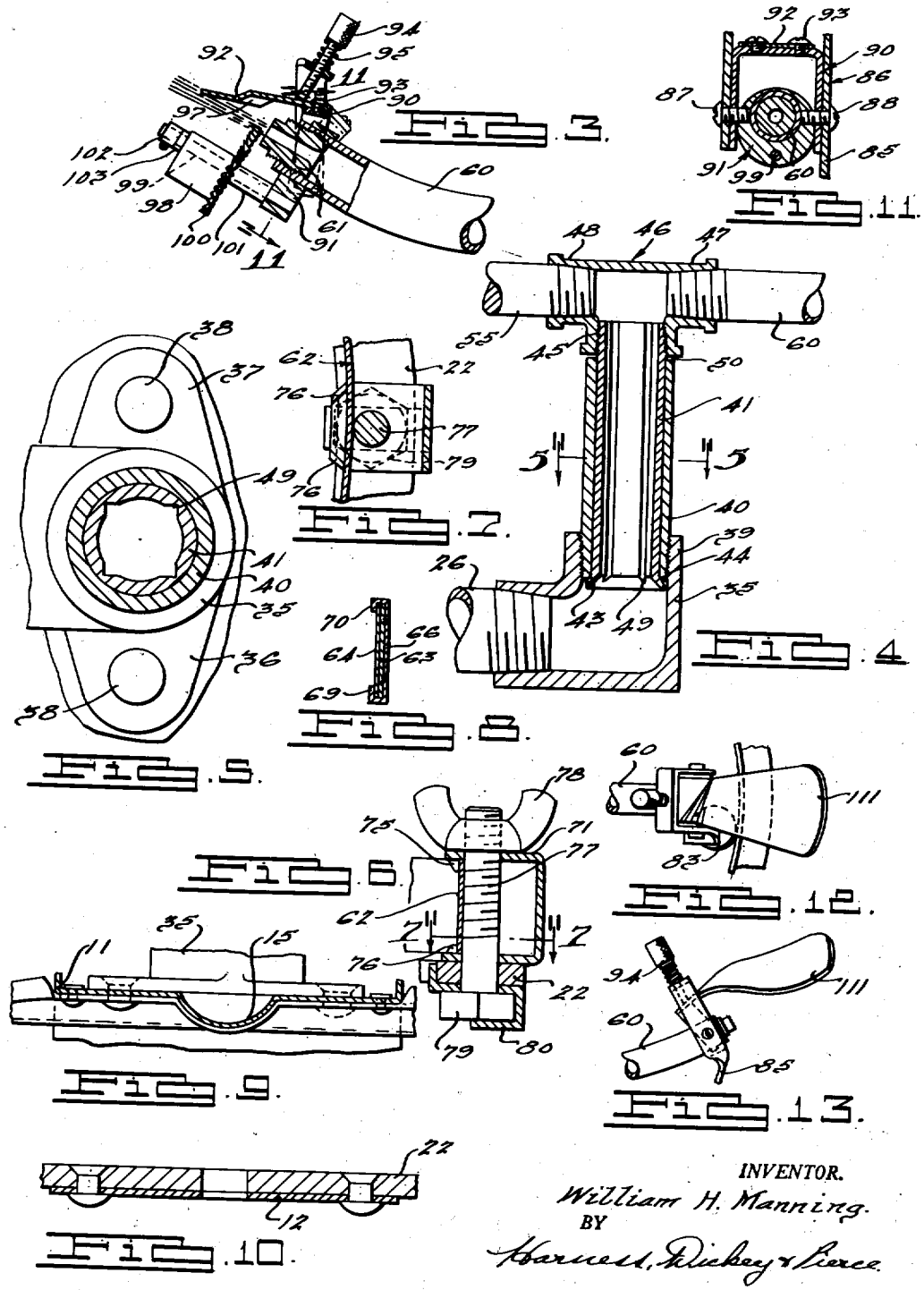
INVENTOR.
William H. Manning.
BY
Barnes, Dickey & Pierce
ATTORNEYS.

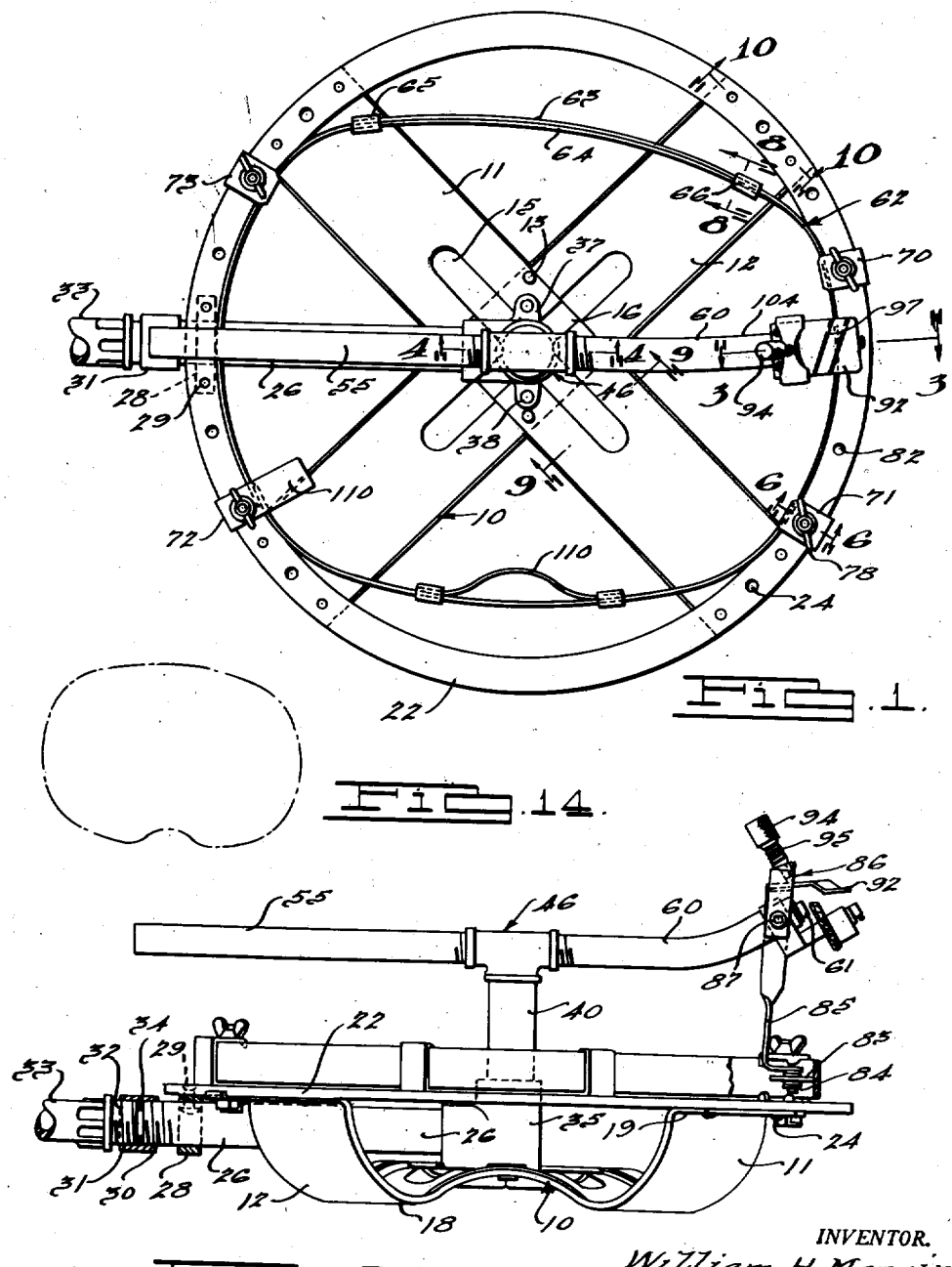

Patented Aug. 28, 1951

2,565,926

UNITED STATES PATENT OFFICE 2,565,926

SPRINKLER WITH ADJUSTABLE CAM

William H. Manning, Birmingham, Mich.

Application June 28, 1945, Serial No. 602,039

9 Claims. (Cl. 299—18)

The invention relates to lawn sprinkling devices, and it has particular relation to a rotary type of lawn sprinkler.

The use of lawn sprinkling devices is widespread and innumerable types of sprinkling devices have been and are used. As a rule the sprinkler elements in the devices used are either of the stationary type, oscillatory type, or rotary type, and probably the latter is in greater use than the others. However, in so far as known, a satisfactory sprinkler has not been provided wherein the sprinkling is so adjustable as to cover various shapes of lawns or areas, particularly where these lawns or areas are of irregular shape. The ordinary rotary sprinkler causes sprinkling over a circular area and some oscillatory sprinklers will cover a rectangular area. In so far as known, however, no satisfactory sprinkler has been provided which will cause a sprinkling action to cover a predetermined irregular area such as is encountered in the normal lawn to be sprinkled. Usually a rotary sprinkler covers only circular areas and it doubles the watering of certain parts of the area due to overlapping of the circles. After using the rotary sprinkler, it is then necessary to sprinkle smaller and separated areas which could not be reached by the rotary sprinkler.

One of the principal objects of the present invention is to provide an improved sprinkling device which is so constructed that the sprinkling action will follow an area which may practically be of any predetermined shape.

Another object of the invention is to provide a sprinkling device of this character which is easily and readily adjustable so that the contour or outline of the area to be sprinkled may be varied almost without limit so that it may be adjusted to sprinkle any shape of lawn.

Another object of the invention is to provide a sprinkling device which may be adjusted to sprinkle any shape of lawn without at the same time sprinkling beyond this area so as thereby to assure a thorough sprinkling action of the entire lawn, while avoiding the disagreeable and wasteful condition where the water is thrown into other areas or upon objects which should not be sprinkled.

Another object of the invention is to provide a sprinkler for accomplishing the aforesaid results which turns at a slow rate of speed so as to assure maximum range or coverage in accordance with a predetermined area to be sprinkled.

Another object of the invention is to provide a sprinkling device for accomplishing all of these results which may be manufactured and assembled with efficiency and also which may be sold at a reasonable price.

Another object of the invention is to provide a sprinkler such as last mentioned which will slowly turn where the distance the water is thrown is greater, and will turn at an increased rate of movement where the distance the water is thrown is shorter.

And in general it is an object of the invention to provide a sprinkling means capable of economical manufacture, which can be adjusted easily to satisfactorily cover regular or irregular areas up to the limit of the water pressure available.

Other objects of the invention will become apparent from the following specification, from the drawings relating thereto, and from the claims hereinafter set forth.

For a better understanding of the invention reference may be had to the drawings wherein:

Figure 1 is a plan view of a sprinkling device constructed according to one form of the invention;

Fig. 2 is a side elevational view of the sprinkling device shown by Fig. 1;

Fig. 3 is a cross-sectional view on a larger scale taken substantially along the line 3—3 of Fig. 1;

Fig. 4 is a cross-sectional view on a larger scale taken substantially along the line 4—4 of Fig. 1;

Fig. 5 is a cross-sectional view on a larger scale taken substantially along the line 5—5 of Fig. 4;

Fig. 6 is a cross-sectional view on a larger scale taken substantially along the line 6—6 of Fig. 1;

Fig. 7 is a cross-sectional view taken substantially along the line 7—7 of Fig. 6;

Fig. 8 is a cross-sectional view on a larger scale taken substantially along the line 8—8 of Fig. 1;

Fig. 9 is a cross-sectional view on a larger scale taken substantially along the line 9—9 of Fig. 1;

Fig. 10 is a cross-sectional view on a larger scale taken substantially along the line 10—10 of Fig. 1;

Fig. 11 is a cross-sectional view taken substantially along the line 11—11 of Fig. 3;

Fig. 12 is a detail view illustrating means for controlling the sprinkling action according to another form of the invention;

Fig. 13 is a side elevational view of the structure shown by Fig. 12; and,

Fig. 14 illustrates, as an example, an irregular outline or area which may be sprinkled by a device constructed according to the invention.

Referring to Figs. 1 and 2, the sprinkling device illustrated comprises a base 10 formed from relatively wide metal strips 11 and 12 arranged in cross fashion and which are fastened together by rivets such as indicated at 13 although the strips may be welded if desired. For reenforcement purposes, the strip 11 has a longitudinally extending depression 15 formed by pressing the metal outwardly towards its lower side and also a depression 16 which extends crosswise of the strip. These depressions intersect at the center of the strip. The other strip 12 has similar depressions and the depression portions on the uppermost strip fit into the depressions in the lowermost strip, from which it follows that the strips may be brought into flat contact with each other.

As shown best by Fig. 2, the strips 11 and 12 are bowed upwardly at their centers, then downwardly between the center and the outer ends, and then upwardly at their outer ends so that the base thus formed may have four areas of contact with the ground, such as indicated at 18, which are disposed in 90° spaced relation. The outer ends of the strips 11 and 12 terminate in outwardly directed flanges such as indicated at 19, and these flanges support and are secured to a flat ring 22. This ring may be manufactured from coil stock by cutting the stock to separate one convolution from the coil, and then the ends of the convolution may be welded. Then the ring is riveted or otherwise secured as indicated at 24 to the flanges 19.

The sprinkling device includes a pipe section 26 extending under the ring 22 and supported thereon between the projecting ends of the strips 11 and 12 by a strap 28 having its ends riveted to the ring as indicated at 29. The outer end of this pipe is threaded into one end of an internally threaded sleeve 31 and the other end of the sleeve is threaded onto a coupling 32 on the end of a hose 33. A sealing ring 34 is disposed in the sleeve 31 between the ends of the coupling 32 and the pipe 26. It should be observed here that there is no reduction in internal diameter through the connection between the hose 33 and the pipe 26 so that a larger flow of water may be obtained. Also since this manner of coupling, hose, and pipe requires turning of the hose, it is desired that the sleeve 31 be so mounted on the pipe that only a part of one turn of the coupling 32 is required to thread the coupling fully into the sleeve against the sealing ring. As a result, the hose is not undesirably twisted and the coupling can be quickly connected and disconnected with respect to the sprinkler.

At its other end, as best shown by Fig. 4, the pipe 26 is threaded into an elbow 35, and this elbow, as seen in Fig. 5, has ears 36 and 37 projecting from opposite sides which are riveted as indicated at 38 to the central part of the base 10. Such elbow includes an upwardly directed end 39 which threadably receives the lower end of a pipe section 40 constituting a fixed bearing for supporting the sprinkler element. The rotary sprinkler element includes a sleeve 41 rotatably disposed in the pipe section 40 and the lower end of this sleeve is outwardly flared. This flare is externally machined to provide a bearing surface 43 and the latter, during use of the sprinkler, has bearing engagement with a similar bearing surface 44 on the lower end of pipe 40. At its upper end, the sleeve 41 is threaded into the middle end 45 of a T-connection 46 having laterally directed internally threaded ends 47 and 48.

In order to facilitate assembly of these parts, the sleeve 41 is provided with internal grooves 49 arranged in 90° spaced relation so as to fit a square shaped holding tool, and by inserting this sleeve into the pipe 40 before the latter is threaded into the elbow 46, the sleeve may be held by the tool mentioned during application of the T-joint on the upper end of the sleeve. It will be noted that a slight space 50 is provided between the upper end of the pipe 40 and the middle end of the T-joint so as to provide desirable clearance. During operation of the sprinkler the force of the water directed upwardly against the T-connection, lifts the sprinkler until the bearing surfaces 43 and 44 are in contact. This bearing engagement prevents leakage and drop in fluid pressure which would be caused by leakage.

The end 48 of the T-joint 46 threadably receives one end of a rod 55 which serves as a counterbalance. The end 47 of the T-joint 46 threadedly receives a pipe 60 which, as best shown by Figs. 2 and 3, extends outwardly and then upwardly at an acute angle to the horizontal. At its outer end, the pipe has a nozzle 61 threaded thereinto, and it follows that water will leave the nozzle in a stream directed at an angle to the horizontal as mentioned. The construction so far described includes a sprinkling element which can rotate about a substantially vertical axis and a nozzle which will throw the water in a stream directed at an acute angle to the horizontal. The present invention is principally concerned with so controlling this stream of water that the area sprinkled will be governed according to a predetermined and adjustable outline corresponding to the area to be sprinkled, and apparatus for accomplishing this result will now be described.

Directing attention now to Fig. 1 in particular, the contour controlling device includes a spring type metal band or ribbon 62 having overlapping ends indicated at 63 and 64. These overlapping ends are retained together to form a complete annulus, by U-shaped clips 65 and 66 which, as best shown by Fig. 8, have reversely turned ends 69 and 70 retaining the ends of the band together while permitting relative endwise movement thereof when desired. From this it should be apparent that the band may be adjusted in length through movement of the overlapping ends relatively.

The band is anchored on the ring 22 at four adjustable points, as seen in Fig. 1, by means of U-shaped clips 70, 71, 72, and 73, and each of these clips, as shown by Fig. 6, has vertically projecting lugs 75 and 76 for retaining the band within the clip. Each of the clips is secured to the ring 22 by means of a fastening bolt 77 extending upwardly through the clip at the outer side of the band, and having a wing nut 78 on its upper end. The lower end of the bolt has a head 79 which is prevented from turning by an angular metal element 80 co-operating with the head and ring 22 as will be readily understood. The ring 22 has openings at a number of points such as indicated at 82 so that the band retaining clips may be moved to different positions as found desirable.

It should be evident now that by arranging the clips in different positions and by changing the band or moving it circumferentially as desired, it may be shaped to most any contour found necessary. For instance, considering Fig. 1, it is evident that the band can be locked in clip 70 and then adjusted for distance of water throw between clips 70 and 71, and then clip 71 can be tightened. This operation can be repeated between clips 71 and 72 and then clip 72 tightened, and then between clips 72 and 73 and then tightening clip 73. Adjustment of the section between clips 73 and 70 can be effected by sliding the ends of the band over each other, and they will stay in adjusted relation by friction between the contacting parts of the bands and clips.

The band annulus thus provided constitutes a contour element or contour track which is adapted to be engaged by a roller 83, shown in Fig. 2, which is turnably mounted on a pin 84 fixed to an arm 85 projecting downwardly from the nozzle end of the pipe 60. This arm 85 is reversely bent at its upper end to provide a U-shaped portion 86 which straddles the end of the pipe and is pivotally mounted thereon, as seen in Fig. 11, by means of oppositely disposed but aligned screws 87 and 88. These screws respectively also extend through opposite legs of an inner U-shaped element 90 and then through an eccentric sleeve 91 disposed on the end of the pipe. Since the inner ends of the screws actually engage the pipe, they become fixed in position on the latter and provide pivotal trunnions for the U-shaped element 90 and also the arm 85, and at the same time, the U-shaped element 90 may pivot independently of the arm 85.

The inner element 90, as best shown by Fig. 3, has a sheet metal baffle or blade 92 fixed to its base by means of screws 93 and as shown by the full and dotted line positions in Fig. 3, the baffle is adapted to move transversely of the water leaving the nozzle 61 so as variably to deflect the water depending upon the position of the baffle. A screw 94 threaded through the base portion of the upper end of the arm 85 provides an adjustable stop for limiting upward movement of the baffle, and a spring 95 on the screw is used to prevent loosening of the screw while permitting an easy adjustment at any time. As seen in Figs. 1 and 3, the baffle has an intermediate, angled portion providing an impact surface 97 against which the water may strike and this angled portion extends transversely of the baffle at an angle to the stream of water leaving the nozzle. This angled portion is so arranged that water striking the surface will create a force component tending to turn the sprinkler clockwise as seen in Fig. 1 and this force will vary depending upon the amount the baffle is moved into the stream of water.

Generally it might be said now that if water is passing through the nozzle 61 with force, it will strike the baffle 92 and hold it in its upper position against the end of screw 95 and this action of the water will also tend to swing the arm 85 counterclockwise as seen in Fig. 2. It follows from the this that the roller 83 will be held against the inner surface of the band 62, and if the sprinkler element is turning, movement of the roller around the inner surface of the band will cause a movement of the arm 85 and hence, a movement of the baffle 92 in accordance with the contour of the band. This movement of the baffle relative to the stream of water leaving the nozzle 61, will deflect the water and its trajectory or in other words, the distance the water is thrown will be changed in accordance with the position of the baffle. If the water is to be thrown a longer distance, the band at that point would have to be farther from the vertical axis of rotation of the sprinkler element so as to permit the baffle to shift further in an upward direction, whereas if distance is to be shortened, the band must shift inwardly toward the vertical axis of rotation so as to cause greater movement of the baffle into the stream of water.

Since the range of fluid movement may be changed at will, it is of importance that the sprinkler rotate very slowly so that the fluid will travel outwardly without any appreciable lateral deflection caused by rotary movement so as to travel a maximum distance. In order to accomplish this result and at the same time obtain a positive drive that will not stop, an eccentric 98 is rotatably mounted on a pin 99 secured in the larger portion of the eccentric sleeve 91 on the pipe 60. The eccentric 98 has a blade type rotor 100 secured to it, and this rotor projects only partly into the stream of water flowing from the nozzle. The blades of the rotor are narrow and angled so as to effect driving of the rotor by the water, but the speed angularity of the blades in addition to the small projection thereof into the stream enables driving the eccentric at a high speed while at the same time preventing any undesirable interference with the stream of water. It is preferable that the rotor project less than half through the stream and that it not turn through more than about one-fourth of the sectional area of the stream. A spacing sleeve 101 is provided between the rotor and eccentric sleeve 91 and a collar 102 is fastened on the outer end of the pin 99 so as to hold the eccentric 98 and rotor 100 on the pin 99. A bearing washer 103 also is disposed between the collar 102 and the eccentric 98.

As the water travels rapidly past the rotor 100, the latter and the eccentric 98 are driven at a high speed, and it is evident that when the heavier part of the eccentric is moving at the side of the pin 99, it will tend to move the sprinkler element in one rotational direction, and to the contrary, when the heavier part of the eccentric is travelling at the other side of the pin, it will tend to turn the sprinkler in the opposite direction. A second force for driving the sprinkler in one direction only is created by angling the pipe 60 a slight amount as indicated at 104 in Fig. 1. In other words, as seen in Fig. 1, the force caused by the off center fluid reaction resulting from the angle in the pipe 60, urges the sprinkler constantly in one direction whereas rotation of the eccentric alternately aids and opposes this motion. A third force may be present if the water strikes the baffle surface 97 and this force will vary depending upon the position of the baffle and is an accelerating force as presently will be evident.

With respect to driving the sprinkler, it should be understood that fluid pressure applied upwardly against the T-connection 46 holds the bearing surfaces 43 and 44 in contact and that the static friction before rotation is initiated is far greater than the running friction present after rotation is established. For this reason, it is practically impossible to provide a fixed jet reaction which will both start rotation and then maintain rotation at a relatively slow speed. In the present device, the off center jet is adjusted to create a torque which is less than that required to overcome the static friction. The operation of the eccentric creates, as stated before, forces alternately aiding and opposing the jet force, and when the force aids the rotation, the combination of forces is sufficient to overcome the static friction whereas when the forces are opposed, rotation perhaps may actually stop. While the sprinkler will thus start and continue rotation at a slow speed, it possibly is a rotation by very small increments. In any event a very slow rotation is obtained and the sprinkler will also overcome the static friction.

The third and variable force caused by the baffle surface acts to vary the speed generally in accordance with variations in distance the water is to be thrown so as to increase the speed or angular velocity where the distance is short and to allow or cause slower rotation or decreased angular velocity where the distance is greater. In this way generally the same amount of water may be sprinkled per unit of area regardless of the length of throw. For a long throw the surface 97 may not be engaged by the water and then as the throw shortens, the surface is engaged more and more by the jet to accelerate the rotation. It should be understood that the sprinkler rotates slowly at all times but that on shorter throws its rate of turning is increased enough to secure wetting of the area to approximately the same degree as where the throw is greater. In other words, the water is sprinkled for a progressively longer time as the length of the throw increases.

In practice, the sprinkler may be placed in an approximately central location on the lawn, and then it may be turned for instance, to bring the clamp 70 into a position where it is aligned with the axis of rotation of the sprinkler and a part of the lawn requiring the longest throw of water such as the most remote corner. The throw of the sprinkler then may be adjusted by means of the screw 94. With clamp 70 tightened and clamp 71 loose, the band between clamps 70 and 71 may be changed in form and length while experimentally moving the sprinkler between these clamps until the throw of water follows the contour of the lawn. Then clamp 71 is tightened. Adjustment between clamps 71 and 72 is secured in the same way and then clamp 72 is tightened. Finally, adjustment of the band between the clamps 72 and 73 is effected by means of the overlapping ends, it being understood that friction between the clips 65 and 66 and band portions will hold such ends in adjusted relation. It should be observed that the clamps can be adjusted around the ring 22 so as to place them as desired, and usually no difficulty would be encountered in positioning the sprinkler so that the four clamps can be located in alignment with four points on the lawn about equidistant from the sprinkler. Attention is directed to a bar 110 shown on clamp 72 which may be swung into a position where it will stop the arm 85, and this may be desired at times when a fixed, non-rotational, spray is desired to sprinkle a particular area.

It may be found desirable in certain cases to provide a hump in the band at one or more places, and this may be accomplished by using a smaller bend segment indicated at 112 in Fig. 1 which may be attached to the band 62 by clamps such as those previously described. Fig. 14 shows approximately the outline of an area which would be sprinkled by the band as seen in Fig. 1.

Once adjusted and fixed, the sprinkler would continue to cover only the area of the lawn and it could be placed in the same position each day or as often as the lawn is sprinkled, without further adjustment.

Figs. 12 and 13 show another form of the invention where instead of using an eccentric rotor, turning of the sprinkler is effected by a twisted baffle indicated at 111 which may be mounted on the pipe in the same way as the baffle 92. The twist in this modified form of baffle would create a driving force and at the same time, the position of the baffle as effected by the roller 83 traveling on the band, would govern the throw of the water.

Although more than one form of the invention has been illustrated and described in detail, it will be apparent to those skilled in the art that various modifications may be made without departing from the scope of the claims.

What is claimed is:

1. In a lawn sprinkler adapted to be adjusted to spray a wide variety of irregularly shaped areas, in combination, a base, a metal band arranged annularly about the base with the wider sides of the band upright relative to the base, adjustable clamps operable for securing the clamps in adjusted position about the periphery of the base and adjustably securing the band to the base at a plurality of points spaced about the periphery of said base, said clamps releasably gripping said band so that the band segment between each pair of points may be varied in length and therefore shape, and a follower rotatably carried by the base and adapted to contact one side of the band.

2. In a lawn sprayer adapted to be adjusted to spray a wide variety of irregularly shaped areas, in combination, a base, a metal band arranged annularly about the base with the wider sides of the band upright relative to the base, adjustable clamps on the base operable for securing the clamps in adjusted position about the periphery of the base and adjustably engaging the band at spaced points so that the band may be linearly shifted relative to the clamps so that the clamps may be shifted on the base, and a follower rotatably carried by the base and contacting a vertical side of the band.

3. In a lawn sprinkler adapted to be adjusted to spray a wide variety of irregularly shaped areas, in combination, a base, a metal band arranged annularly about the base with the wider sides of the band upright relative to the base, adjustable clamps on the base operable for securing the clamps in adjusted position about the periphery of the base and adjustably engaging the band at spaced points so that the band may be linearly shifted relative to the clamps so that the clamps may be shifted on the base, said band having overlapping ends movable linearly of each other so that the length of the annulus may be changed, means for holding the ends in adjusted positions, and a cam follower carried by the base and contacting a vertical side of the band.

4. A lawn sprinkler adjustable to water areas of variable size which may be circular, rectangular, or of a wide variety of irregular shapes, said sprinkler comprising a base, a sprinkler head rotatably mounted on said base and including a nozzle adapted to throw water outwardly of said base, means for rotating said sprinkler head, flexible metal band cam means, clamps mounting said flexible metal band cam means on said base and adapted to be adjusted to maintain said metal band cam means in a shape conforming operatively to the shape of the area to be watered, an arm pivotally mounted on said sprinkler head, a cam follower on one end of said arm and engaging said cam means, and a baffle on the other end of said arm and so related to said nozzle that swinging of said arm, in response to movement of said cam follower along said cam means, moves said baffle variably into and out of the water jet thrown from the nozzle.

5. A lawn sprinkler adjustable to substantially uniformly water areas of variable size which may be circular, rectangular, or of a wide variety of irregular shapes, said sprinkler comprising a base, a sprinkler head rotatably mounted on said base and including a nozzle adapted to throw water outwardly of said base, means for rotating said sprinkler head, flexible metal band cam means, clamps mounting said cam means on said base and adapted to be adjusted to maintain said metal band cam means in a desired shape conforming operatively to the shape of the area to be watered, an arm pivotally mounted on said sprinkler head, a cam follower mounted on one end of said arm and engaging said cam means, and a baffle mounted on the other end of said arm and so related to the nozzle that swinging of said arm in response to movement of said cam follower along said cam means moves said baffle variably into and out of the water jet thrown from the nozzle, said baffle having the portion adapted to be moved into said jet of water so inclined relative to said sprinkler head that the action of said jet of water on said baffle creates a force augmenting said means for rotating said sprinkler head.

6. A lawn sprinkler adjustable to substantially uniformly water areas of variable size which may be circular, rectangular, or of a wide variety of irregular shapes, said sprinkler comprising a base, a sprinkler head rotatably mounted on said base and including a nozzle adapted to throw water outwardly of said base, means for rotating said sprinkler head, flexible metal band cam means including overlapping end portions movable linearly of each other whereby the effective length thereof may be readily varied, clamps mounting said cam means on said base and adapted to be adjusted to maintain said metal band cam means in a desired shape conforming operatively to the shape of the area to be watered, an arm pivotally mounted on said sprinkler head, a cam follower mounted on one end of said arm and engaging said cam means, and a baffle mounted on the other end of said arm and so related to the nozzle that swinging of said arm in response to movement of said cam follower along said cam means moves said baffle variably into and out of the water jet thrown from the nozzle, said baffle having the portion adapted to be moved into said jet of water so inclined relative to said sprinkler head that the action of said jet of water on said baffle creates a force augmenting said means for rotating said sprinkler head.

7. A lawn sprinkler adjustable to substantially uniformly water areas of variable size which may be circular, rectangular, or of a wide variety of irregular shapes, said sprinkler comprising a base, a sprinkler head rotatably mounted on said base and including a nozzle adapted to throw water outwardly of said base, means for rotating said sprinkler head, flexible metal band cam means having overlapping end portions movable linearly of each other whereby the effective length thereof may be readily varied, a plurality of adjustable clamps mounted on said base and operable for securing the clamps in adjusted position about the periphery of said base and releasably gripping said metal band cam means so that the length of said cam means between each of said clamps may be varied as desired, an arm pivotally mounted on said sprinkler head, a cam follower on one end of said arm and engaging said cam means, and a baffle on the other end of said arm and so related to the nozzle that swinging of said arm in response to movement of said cam follower along said cam means moves said baffle variably into and out of the water jet thrown from the nozzle, said baffle having the portion adapted to be moved into said jet of water so inclined relative to said sprinkler head that the action of said jet of water on said baffle creates a force augmenting said means for rotating said sprinkler head.

8. A lawn sprinkler adjustable to substantially uniformly water areas of variable size which may be circular, rectangular, or of a wide variety of irregular shapes, said sprinkler comprising a base, a sprinkler head rotatably mounted on said base and including a nozzle adapted to throw water outwardly of said base, means for rotating said sprinkler head, flexible metal band cam means having overlapping end portions movable linearly of each other whereby the effective length thereof may be readily varied, a plurality of clamps mounted on said base and adjustable relative thereto and releasably gripping said metal band cam means so that the length of said cam means between each of said attaching means may be varied as desired, an arm pivotally mounted on said sprinkler head, a cam follower on one end of said arm and engaging said cam means, a baffle on the other end of said arm and so related to the nozzle that swinging of said arm in response to movement of said cam follower along said cam means moves said baffle variably into and out of the water jet thrown from the nozzle, said baffle having the portion adapted to be moved into said jet of water so inclined relative to said sprinkler head that the action of said jet of water on said baffle creates a force augmenting said means for rotating said sprinkler head, said means for rotating said sprinkler head including an impeller wheel mounted on said head for rotation about an axis spaced from but substantially parallel to the axis of said nozzle, said impeller wheel having a plurality of similar blades spaced equiangularly about its periphery and adapted to be engaged by the jet of water from said nozzle for rotating said wheel, said wheel being disposed to project into the jet of water from said nozzle to an extent affording substantially uniform distribution of the water of jet throughout the radial extent which the jet is thrown, and an eccentric rotated about the axis of said impeller wheel by the latter and disposed out of the path of the jet from said nozzle, the axis of said nozzle being spaced from the axis of rotation of said sprinkler head so that the jet reaction at said nozzle tends to rotate said sprinkler head and the rotation of said eccentric intermittently producing a force cooperating with said jet reaction at said nozzle to produce rotation of said sprinkler head.

9. A lawn sprinkler adjustable to substantially uniformly water areas of variable size which may be circular, rectangular, or of a wide variety of irregular shapes, said sprinkler comprising a base, a sprinkler head rotatably mounted on said base and including a nozzle adapted to throw water outwardly of said base, means for rotating said sprinkler head, flexible metal band cam means having overlapping end portions movable linearly of each other whereby the effective length thereof may be readily varied, a plurality of clamps mounted on said base and adjustable relative thereto and releasably gripping said metal band cam means so that the length of said cam means between each of said attaching means may be varied as desired, an arm pivotally mounted on said sprinkler head, a cam follower mounted on one end of said arm and engaging said cam means, a baffle mounted on the other end of said arm and so related to the nozzle that swinging of said arm in response to movement of said cam follower along said cam means moves said baffle variably into and out of the water jet thrown from the nozzle, said baffle having the portion adapted to be moved into said jet of water so inclined relative to said sprinkler head that the action of said jet of water on said baffle creates a force acting to increase the speed of rotation of said sprinkler head, and means for varying the angular position of said baffle relative to said arm to correspond to the size of the area it is desired to water.

WILLIAM H. MANNING.

REFERENCES CITED

The following references are of record in the file of this patent:

UNITED STATES PATENTS

| Number | Name | Date |
| --- | --- | --- |
| 1,131,953 | Pilkington | Mar. 16, 1915 |
| 1,593,918 | Stanton | July 27, 1926 |
| 1,598,541 | Orr | Aug. 31, 1926 |
| 1,637,413 | Elder | Aug. 2, 1927 |
| 1,730,623 | Orr | Oct. 8, 1929 |
| 1,763,979 | Nelson | June 17, 1930 |
| 1,938,838 | Jacobson | Dec. 12, 1933 |
| 1,950,512 | Norland | Mar. 13, 1934 |
| 1,962,308 | Jacobson | June 12, 1934 |
| 2,064,066 | Jepson et al. | Dec. 15, 1936 |
| 2,090,406 | Thompson | Aug. 17, 1937 |
| 2,188,108 | Dorman | Jan. 23, 1940 |
| 2,307,214 | Gollmer | Jan. 5, 1943 |
| 2,314,702 | Higgins | Mar. 23, 1943 |
| 2,393,773 | Hoffer | Jan. 29, 1946 |

FOREIGN PATENTS

| Number | Country | Date |
| --- | --- | --- |
| 265,225 | Great Britain | July 21, 1927 |
| 289,843 | Great Britain | June 28, 1928 |
| 496,284 | Germany | Apr. 16, 1930 |

Certificate of Correction

Patent No. 2,565,926                                 August 28, 1951

WILLIAM H. MANNING

It is hereby certified that error appears in the printed specification of the above numbered patent requiring correction as follows:

Column 6, line 18, for "speed" read *steep*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*